United States Patent
Loehr et al.

(10) Patent No.: US 11,849,484 B2
(45) Date of Patent: *Dec. 19, 2023

(54) TRANSPORT BLOCK TRANSMISSION

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,487

(22) Filed: Mar. 10, 2022

(65) Prior Publication Data

US 2022/0201751 A1 Jun. 23, 2022

Related U.S. Application Data

(63) Continuation of application No. 16/851,511, filed on Apr. 17, 2020, now Pat. No. 11,291,049.
(Continued)

(51) Int. Cl.
*H04W 74/08* (2009.01)
*H04L 1/1812* (2023.01)
(Continued)

(52) U.S. Cl.
CPC ....... *H04W 74/0808* (2013.01); *H04L 1/1819* (2013.01); *H04W 72/1263* (2013.01); *H04W 72/23* (2023.01)

(58) Field of Classification Search
None
See application file for complete search history.

(56) References Cited

U.S. PATENT DOCUMENTS 11,291,049 B2 * 3/2022 Loehr ............... H04W 74/0808
2016/0345326 A1 * 11/2016 Yerramalli .............. H04L 1/187
(Continued)

FOREIGN PATENT DOCUMENTS

KR 20190017588 A 2/2019

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, pp. 1-363.
(Continued)

*Primary Examiner* — Anh Vu H Ly
(74) *Attorney, Agent, or Firm* — Kunzler Bean & Adamson

(57) ABSTRACT

Apparatuses, methods, and systems are disclosed for transport block transmission. One method includes determining a failure of a listen-before-talk procedure for transmission of a transport block on a configured uplink grant at a first transmission opportunity associated with a hybrid automatic repeat request process. The method includes, in response to determining the failure of the listen-before-talk procedure, not transmitting the transport block on the configured uplink grant at the first transmission opportunity corresponding to the listen-before-talk procedure. The method includes autonomously triggering transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

20 Claims, 4 Drawing Sheets

Related U.S. Application Data

(60) Provisional application No. 62/835,974, filed on Apr. 18, 2019.

(51) Int. Cl.
 *H04W 72/1263* (2023.01)
 *H04W 72/23* (2023.01)

(56) References Cited

U.S. PATENT DOCUMENTS

| | | | |
|---|---|---|---|
| 2017/0222749 A1 | 8/2017 | Dinan | |
| 2017/0245302 A1* | 8/2017 | Mukherjee | H04W 72/1268 |
| 2017/0303136 A1* | 10/2017 | Park | H04W 74/0808 |
| 2018/0310334 A1* | 10/2018 | Mukherjee | H04W 74/004 |
| 2018/0332611 A1* | 11/2018 | Li | H04W 72/1268 |
| 2019/0044663 A1 | 2/2019 | Rosa et al. | |
| 2019/0150184 A1 | 5/2019 | Golitschek Edler von Elbwart et al. | |
| 2019/0159256 A1* | 5/2019 | Talarico | H04L 1/187 |
| 2019/0166617 A1* | 5/2019 | Park | H04W 72/0446 |
| 2019/0335496 A1 | 10/2019 | Li et al. | |
| 2019/0342921 A1 | 11/2019 | Loehr et al. | |
| 2020/0107277 A1 | 4/2020 | Jeon et al. | |
| 2020/0260486 A1 | 8/2020 | Zhou et al. | |
| 2020/0275485 A1 | 8/2020 | Babaei et al. | |
| 2020/0396024 A1 | 12/2020 | Ganesan et al. | |
| 2021/0058833 A1 | 2/2021 | Basu Mallick et al. | |
| 2021/0084586 A1 | 3/2021 | Loehr et al. | |
| 2021/0092789 A1 | 3/2021 | Basu Mallick et al. | |
| 2021/0344451 A1* | 11/2021 | Hedayat | H04L 1/1861 |
| 2021/0392685 A1* | 12/2021 | Myung | H04W 74/0816 |
| 2022/0116152 A1* | 4/2022 | Iyer | H04L 1/188 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, pp. 1-77.

3GPP, "3rd Generation Partnership Project; Technical Specification Group Radio Access Network; Physical layer procedures for shared spectrum channel access (Release 15)", 3GPP TS 37.213 V15.2.0, Mar. 2019, pp. 1-20.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, pp. 1-552.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.

Huawei, Hisilicon, "Transmission with configured grant in NR unlicensed band", 3GPP TSG RAN WG1 Meeting #96bis R1-1903931, Apr. 8-12, 2019, pp. 1-19.

Qualcomm Incorporated, "Enhancements to Scheduling and HARQ operation for NR-U", 3GPP TSG RAN WG1 Meeting #96b R1-1905001, Apr. 8-12, 2019, pp. 1-13.

Intel Corporation, "Configured UL grant enhancement for NR Unlicense", 3GPP TSG-RAN WG2 103 R2-1812245, Aug. 20-24, 2018, pp. 1-4.

* cited by examiner

TRANSPORT BLOCK TRANSMISSION

CROSS-REFERENCE TO RELATED APPLICATIONS

This application is a continuation application of U.S. patent application No. 16/851,511 filed on Apr. 17, 2020, which claims priority to U.S. Patent Application Ser. No. 62/835,974 entitled "APPARATUSES, METHODS, AND SYSTEMS FOR TRANSMISSION BEHAVIORS ON CONFIGURED GRANT RESOURCES IN NR-U" and filed on Apr. 18, 2019 for Joachim Loehr, all of which are incorporated herein by reference in their entirety.

FIELD

The subject matter disclosed herein relates generally to wireless communications and more particularly relates to transport block transmission.

BACKGROUND

The following abbreviations are herewith defined, at least some of which are referred to within the following description: Third Generation Partnership Project ("3GPP"), 5th Generation ("5G"), QoS for NR V2X Communication ("5QI/PQI"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Autonomous Uplink ("AUL"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDP"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, LBT procedures may be used.

BRIEF SUMMARY

Methods for transport block transmission are disclosed. Apparatuses and systems also perform the functions of the methods. One embodiment of a method includes determining a failure of a listen-before-talk procedure for transmission of a transport block on a configured uplink grant at a first transmission opportunity associated with a hybrid automatic repeat request process. In some embodiments, the method includes, in response to determining the failure of the listen-before-talk procedure, not transmitting the transport block on the configured uplink grant at the first transmission opportunity corresponding to the listen-before-talk procedure. In various embodiments, the method includes autonomously triggering transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

One apparatus for transport block transmission includes a processor that: determines a failure of a listen-before-talk procedure for transmission of a transport block on a configured uplink grant at a first transmission opportunity associated with a hybrid automatic repeat request process; in response to determining the failure of the listen-before-talk procedure, does not initiate transmission of the transport block on the configured uplink grant at the first transmission opportunity corresponding to the listen-before-talk procedure; and autonomously triggers transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
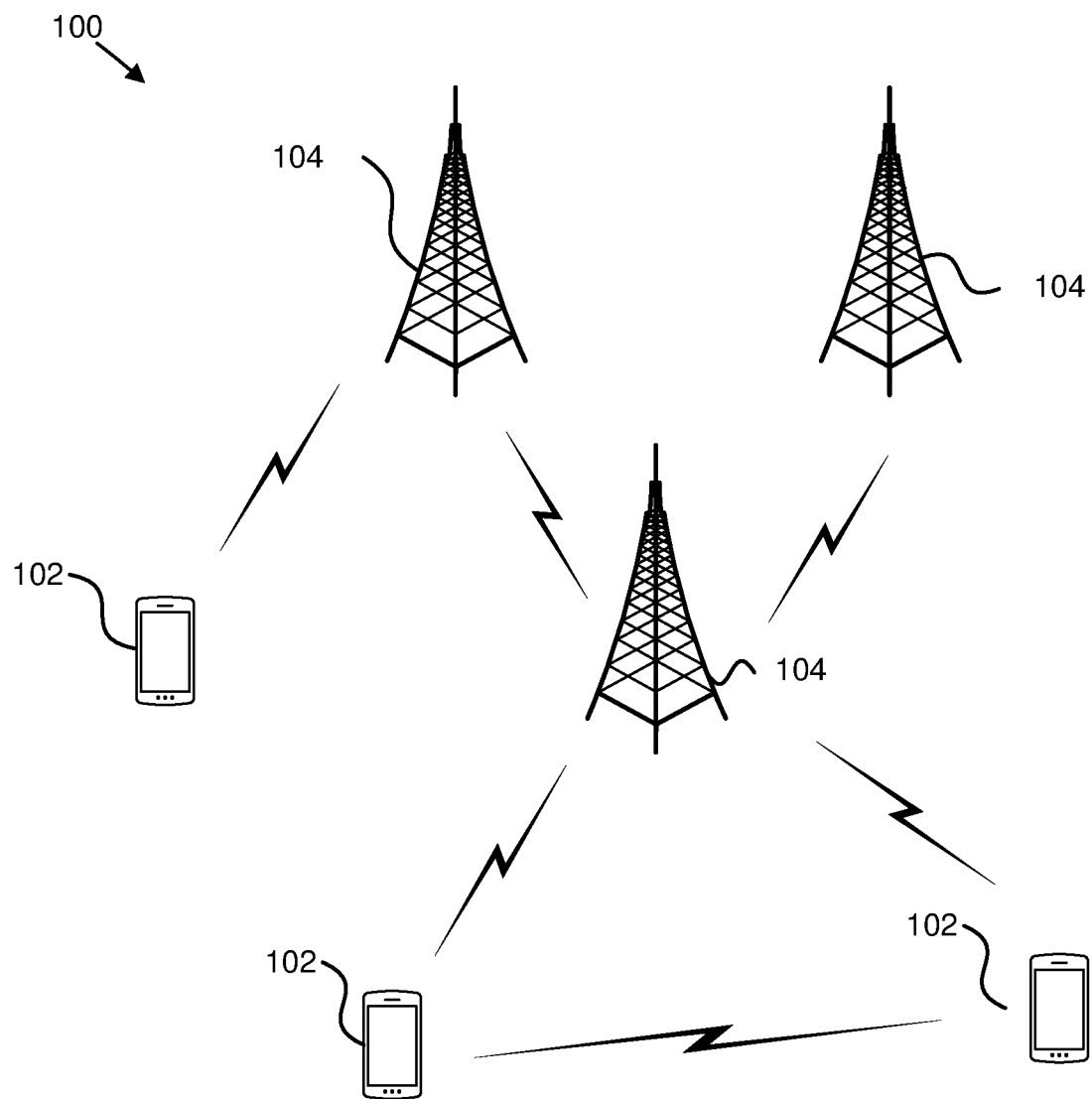
FIG. 1 is a schematic block diagram illustrating one embodiment of a wireless communication system for transport block transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transport block transmission. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine a failure of a listen-before-talk procedure for transmission of a transport block on a configured uplink grant at a first transmission opportunity associated with a hybrid automatic repeat request process. In some embodiments, the remote unit 102 may, in response to determining the failure of the listen-before-talk procedure, not transmit the transport block on the configured uplink grant at the first transmission opportunity corresponding to the listen-before-talk procedure. In various embodiments, the remote unit 102 may autonomously trigger transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity. Accordingly, the remote unit 102 may be used for transport block transmission.

Figure 2:
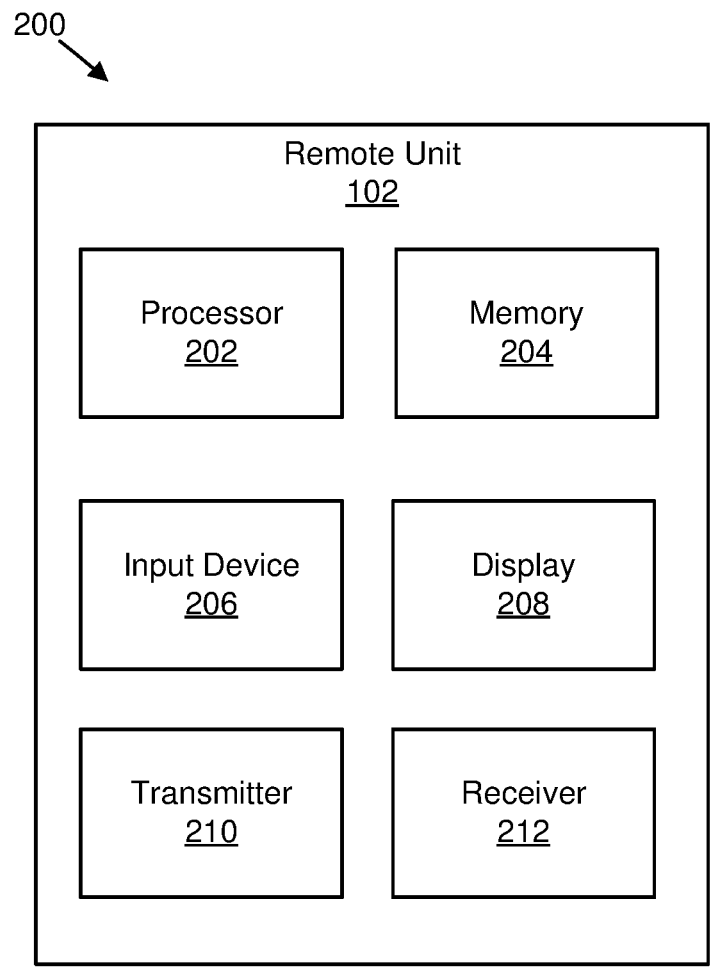
FIG. 2 is a schematic block diagram illustrating one embodiment of an apparatus that may be used for transport block transmission.

FIG. 2 depicts one embodiment of an apparatus 200 that may be used for transport block transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: determine a failure of a listen-before-talk procedure for transmission of a transport block on a configured uplink grant at a first transmission opportunity associated with a hybrid automatic repeat request process; in response to determining the failure of the listen-before-talk procedure, does not initiate transmission of the transport block on the configured uplink grant at the first transmission opportunity corresponding to the listen-before-talk procedure; and autonomously trigger transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
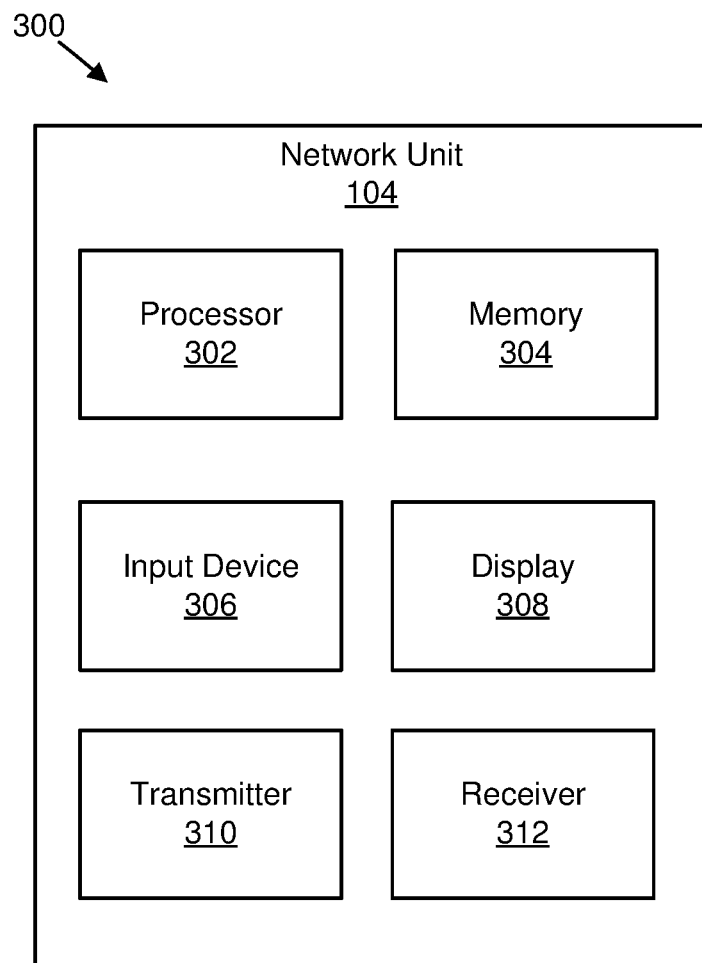
FIG. 3 is a schematic block diagram illustrating one embodiment of an apparatus that may be used for transport block reception.

FIG. 3 depicts one embodiment of an apparatus 300 that may be used for transport block reception. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, such as for LTE eLAA, AUL transmissions may be enabled through a combination of RRC signaling and an activation message conveyed by a DCI in a physical control channel. In various embodiments, an RRC configuration includes subframes in which the UE is allowed to transmit autonomously, as well as eligible HARQ process IDs. In certain embodiments, such as for configured uplink grants, if an UL HARQ operation is autonomous, a HARQ process ID associated with a TTI for transmission on a serving cell may be selected by a UE implementation from the HARQ process IDs that are configured for autonomous UL HARQ operation by upper layers in aul-HARQ-Processes. In such an embodiment, an activation message includes a RBA and MCS, from which a UE is able to determine a transport block size for any AUL transmission.

In one embodiment, it may be possible to autonomously retransmit data pertaining to a transport block that has not been received correctly by an eNB. In such an embodiment, a UE may monitor downlink feedback information (e.g., AUL-DFI), which may be transmitted by the eNB and includes HARQ-ACK information for AUL-enabled HARQ process IDs. Moreover, the UE may detect a NACK message, may try to autonomously access a channel for a retransmission of a same transport block in a corresponding HARQ process. In some embodiments, an autonomous uplink transmission includes at least a HARQ process ID and an NDI accompanying a PUSCH (e.g., AUL-UCI).

In some embodiments, an eNB may transmit an uplink grant through a DCI that assigns uplink resources for a retransmission of the same transport block using an indicated HARQ process. In certain embodiments, an eNB transmits an uplink grant through a DCI that assigns uplink resources for a transmission of a new transport block using an indicated HARQ process. In such embodiments, even though a HARQ process ID may be eligible for AUL transmissions, the eNB may still have access to this process at any time through a scheduling grant (e.g., DCI). In various embodiments, if a UE detects a grant for an UL transmission for a subframe that is eligible for AUL (e.g., according to an RRC configuration), it may follow a received grant and may not perform an AUL transmission in that subframe.

In one embodiment, four channel access priority classes may be used for performing uplink and downlink transmissions in LAA carriers as shown in Table 1.

TABLE 1

Channel Access Priority Class for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127, 255,511,1023} |
| 4 | 7 | 15 | 1023 | 6 ms or 10 ms | {15,31,63,127, 255,511,1023} |

NOTE1:
For p = 3,4, $T_{ulm\ cot,p}$ = 10 ms if the higher layer parameter 'absenceOfAnyOtherTechnology-r14' indicates TRUE, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 µs. The maximum duration before including any such gap shall be 6 ms.

In some embodiments, for uplink transmissions dynamically scheduled, an eNB may select a channel access priority class by taking into account a lowest priority QCI in an LCG. In various embodiments, for UE-initiated uplink transmission on configured grant resources for AUL transmissions, the UE may select a lowest channel access priority class (e.g., highest signaled value) of a logical channel with a MAC SDU multiplexed into a MAC PDU. In certain embodiments, MAC CEs (e.g., except padding BSR) may apply a highest channel access priority class (e.g., lowest signaled value).

In one embodiment, for dynamically scheduled PUSCH transmissions on an LAA cell, a network may select a CAPC and may signal it within an UL grant (e.g., DCI), such as using information found in Table 2.

TABLE 2

Format 0A

DCI format 0A is used for the scheduling of PUSCH in a LAA SCell, or activating/releasing AUL transmission as defined in [3], or indicating AUL downlink feedback information (AUL-DFI) to a UE that is activated with AUL transmission.
The following information is transmitted by means of the DCI format 0A:
Channel Access type-1 bit as defined in subclause 4.2 of [8]
Channel Access Priority Class-2 bits as defined in subclause 4.2 of [8]

In one embodiment, if a TB has been generated for AUL transmission on a CG resource and LBT fails, configuredGrantTimer may not be started. Such an embodiment may lead to a situation that at a next transmission opportunity for a same HARQ process, the configuredGrantTimer is not running which in turn triggers a UE to generate a new TB. Therefore, the previous TB which was not transmitted due to LBT failure may be lost.

In some embodiments, a UE may select a lowest channel access priority class (e.g., highest signaled value) of a logical channel with MAC SDU multiplexed into a MAC PDU for transmission on a configured grant resource and/or AUL transmission. In such embodiments, if data having a high CAPC (e.g., SRBs or MAC CEs) is multiplexed with data of LCHs having a low CAPC in the same PDU, the UE may select the lowest CAPC for the transmission of the MAC PDU. This may negatively impact a QoS of high priority data. In certain embodiments, NR-U may use a standalone operation in which SRBs and MAC CEs are transmitted on an unlicensed cell. In various embodiments, for LAA, high priority data may be transmitted on a licensed cell.

As described herein, the term eNB and/or gNB may be used for a base station but it may be replaceable by any other radio access node (e.g., BS, eNB, gNB, AP, NR, etc.). Moreover, methods described herein may be in the context of 5G NR. However, the methods described herein may be equally applicable to other mobile communication systems supporting serving cells and/or carriers configured in an unlicensed spectrum LTE mobile wireless or cellular telecommunications system.

In a first embodiment, such as for cases in which UL LBT fails for a PUSCH transmission (e.g., attempted transmission) on a configured grant or AUL resource associated with a HARQ process, a UE may transmit a TB pending in a HARQ process in a next transmission opportunity of the same HARQ process. In such embodiments, the next transmission opportunity of the same HARQ process may be a configured grant resource or a scheduled grant resource. Moreover, even though a configuredGrantTimer is not started and/or restarted if UL LBT fails for the configured grant transmission and may not be running at the next transmission opportunity for the same HARQ process, the UE may be enabled to transmit the pending TB at the next transmission attempt. Therefore, the UE may not generate a new TB (e.g., the UE may not consider an NDI bit for the corresponding HARQ process to have been toggled) at the next transmission opportunity for the same HARQ process even though the configuredGrantTimer is not running.

In one implementation of the first embodiment, the UE may start a new timer t1 (e.g., it may be referred to as LBT_ReTx timer) if the UL LBT fails for a PUSCH transmission on a configured grant resource for an AUL transmission. In such an implementation, at the expiry of the timer t1, the UE may trigger an autonomous retransmission for the corresponding HARQ process and trigger another transmission attempt (e.g., the expiry of the timer may be considered as having received a NACK). Furthermore, upon expiry of this timer the UE may disregard a current status of the configuredGrantTimer (e.g., whether it is running), or consider the configuredGrantTimer as running and trigger an autonomous retransmission. In another implementation of the first embodiment, a new timer t1 is started if a TB is actually transmitted (e.g., if there is a successful LBT) on configured grant resources and used for autonomous retransmission (e.g., if a timer expires, the UE considers the transport block as having been acknowledged with a NACK indication). In a further implementation of the first embodiment, the UE is configured with a maximum number of retransmissions that may be autonomously triggered by the UE.

The first embodiment may use the options in Table 3 for NR. It should be noted that Table 3 is one example of an implementation of the first embodiment.

In another implementation of the second embodiment, the UE stores a TB that couldn't be transmitted on a configured grant PUSCH resource (e.g., AUL transmission) due to the LBT failure in a separate HARQ TX buffer. In such an implementation, if the UE has a CG resource for an initial transmission (e.g., configuredGrantTimer is not running for an associated HARQ process), the UE checks whether there is a MAC PDU stored in a separate buffer. If there is a MAC PDU stored, the UE may obtain this PDU (e.g., given that the size of the MAC PDU in the buffer matches the configured uplink grant uplink size), instruct the HARQ process to trigger a new transmission (e.g., with the MAC PDU), and instruct a physical layer to generate a transmission. In such an implementation, a separate TX buffer may consecutively be flushed.

In a third embodiment, a UE may be enabled to not multiplex MAC SDUs of a logical channel having a lower channel access priority class into a MAC PDU (e.g., even if there is data for such a logical channel available for transmission in the UEs buffer) if the MAC PDU contains MAC SDUs of a logical channel having a highest channel access priority class (e.g., SRB and/or MAC CEs). In such embodiments, to avoid a situation in which the UE has to select and/or use a low channel access priority class (e.g., lower than the highest) for the transmission of a MAC PDU carrying high priority data such as SRBs or MAC CEs because data of a logical channel having a low channel access priority class is multiplexed within this MAC PDU, the UE may be enabled to multiplex a padding PDU into the MAC PDU rather than data of a LCH having a low channel access priority class. For the third embodiment, the MAC PDU may be transmitted on an AUL and/or CG grant resource (e.g., UE initiated uplink transmission). In various embodiments, according to an LCP procedure, a UE may

TABLE 3

For each Serving Cell and each configured uplink grant, if configured and activated, the MAC entity shall:
1 > if the PUSCH duration of the configured uplink grant does not overlap with the PUSCH duration of an uplink grant received on the PDCCH or in a Random Access Response for this Serving Cell:
    2 > set the HARQ Process ID to the selected HARQ Process ID
    2 > if the configuredGrant Timer for the corresponding HARQ process is not running:
        3 > if UL LBT for the previous transmission attempt of the selected HARQ process was indicated as successful
            4 > consider the NDI bit for the corresponding HARQ process to have been toggled;
            4 > deliver the configured uplink grant and the associated HARQ information to the HARQ entity.

In a second embodiment, a UE may make a transmission attempt for a TB associated with a HARQ process for which LBT failed for a previous transmission attempt on a configured grant PUSCH resource (e.g., AUL transmission) using another HARQ process associated with a configured grant PUSCH resource. In such an embodiment, the UE may, instead of generating a new TB for this other HARQ process, transmit an already generated TB that is pending for transmission due to the LBT failure. In such an embodiment, an assumption may be that a TB size is the same for two HARQ processes and the configured grant resources associated with the two HARQ processes. In one implementation of the second embodiment, the UE checks, before obtaining a new MAC PDU for an initial transmission on a configured uplink grant PUSCH resource, whether there is a TB pending for transmission due to the LBT failure. If a size of a pending TB matches the configured uplink grant, the UE may transmit the pending TB on the configured uplink grant PUSCH resource. In such an embodiment, generation of a new MAC PDU may be skipped.

multiplex data of LCHs into a MAC PDU (e.g., as long as there is data in the UEs buffer) rather than using padding. In one implementation of the third embodiment, a UE may only be enabled to multiplex padding into a MAC PDU if an amount of data having a highest channel access priority class within the MAC PDU exceeds a certain configured size threshold such as a value or a percentage. Such a size threshold may be configured by higher layer signaling.

In another implementation of the third embodiment, the UE may not multiplex MAC SDUs of LCHs having a lower channel access priority class than a configured priority class threshold if the MAC PDU contains data of an LCH having the highest channel access priority class (e.g., lowest signaled value) (e.g., MAC CEs or SRBs). In such an implementation, the UE may be configured with the priority class threshold (e.g., by means of RRC signaling). In various embodiments, during an LCP procedure (e.g., if a MAC PDU is generated), a UE may check whether a LCH is enabled to multiplex data within a MAC PDU depending on a channel access priority class configured for a LCH. In certain embodiments, if data of a LCH having a highest channel access priority class or MAC CEs multiplexed in a MAC PDU, a UE may not multiplex data of other LCHs having a channel access priority class lower than a configured priority class threshold in the MAC PDU.

In various implementations of the third embodiment, the UE may be configured with channel access priority class multipexing rules. The channel access priority class multiplexing rules may determine data from which a channel access priority class may be multiplexed within the same MAC PDU. The UE may be configured with the channel access priority class multiplexing rules by higher layer signaling (e.g., RRC signaling).

In a fourth embodiment, if receiving a DCI for a PUSCH transmission on an unlicensed cell in which the DCI indicates a channel access priority class, a UE may only be enabled to multiplex data of LCHs or MAC CEs in a MAC PDU that has the same or a higher channel access priority class (e.g., lower CAPC value) than a signaled CAPC value in the DCI. For example, if the DCI indicates CAPC=1, the UE may only multiplex data that has the channel access priority class equal to one (e.g., highest channel access priority class). In the fourth embodiment, the UE may not be enabled to multiplex data of LCHs or MAC CEs that have a lower channel access priority class (e.g., CAPC=3). In certain implementations of the fourth embodiment, an LCP procedure may only consider LCHs and/or MAC CEs for TB generation satisfying a channel access priority class condition (e.g., CAPC if configured) smaller than or equal to a CAPC value signaled within an UL grant. In some embodiments, a UE may generate padding PDU to achieve a transport block size that is determined according to a configured grant transmission.

In a fifth embodiment, a UE may increase a channel access priority class (e.g., adopt a lower channel access priority class value) for a next transmission attempt of a same MAC PDU if a previous transmission attempt was not successful (e.g., if the MAC PDU couldn't be transmitted on PUSCH due to an LBT failure). In one implementation of the fifth embodiment, the UE increases the channel access priority class (e.g., lowers a corresponding value) for a next transmission attempt if there is LBT failure if the MAC PDU contains high priority data such as SRBs or MAC CEs. In one example, if a channel access priority class value of 3 is used for a transmission attempt, then a UE may use the channel access priority class value of 2 for the next transmission attempt of the same TB. In another implementation of the fifth embodiment, the UE may increase the channel access priority class of a TB for a HARQ retransmission. In one example, if the initial transmission of a TB was done with a channel access priority class value of 3, then the UE may use a channel access priority class value of 2 for a HARQ retransmission if an initial transmission or an earlier retransmission wasn't successfully decoded.

In a sixth embodiment, if a channel access priority class indicated within a DCI is low (e.g., high signaled value) and there is high priority data associated with a highest channel access priority class (e.g., lowest value) in a UE available for transmission (e.g., SRBs and/or MAC CEs), the UE may select the highest channel access priority class (e.g., lowest signaled value) of the logical channel with MAC SDU multiplexed into a MAC PDU (e.g., channel access priority class of the SRB). In such an embodiment, the UE may ignore a CAPC value signaled within the DCI and select a CAPC according to high priority data associated with a highest channel access priority class (e.g., lowest value) multiplexed within the MAC PDU corresponding to the DCI (e.g., UL grant).

As may be appreciated, as used herein a higher channel access priority class may be associated with a lower channel access priority class value while a lower channel access priority class may be associated with a higher channel access priority class value. It should be noted that different embodiments described herein are not mutually exclusive, but any combination of the embodiments described herein may be used.

Figure 4:
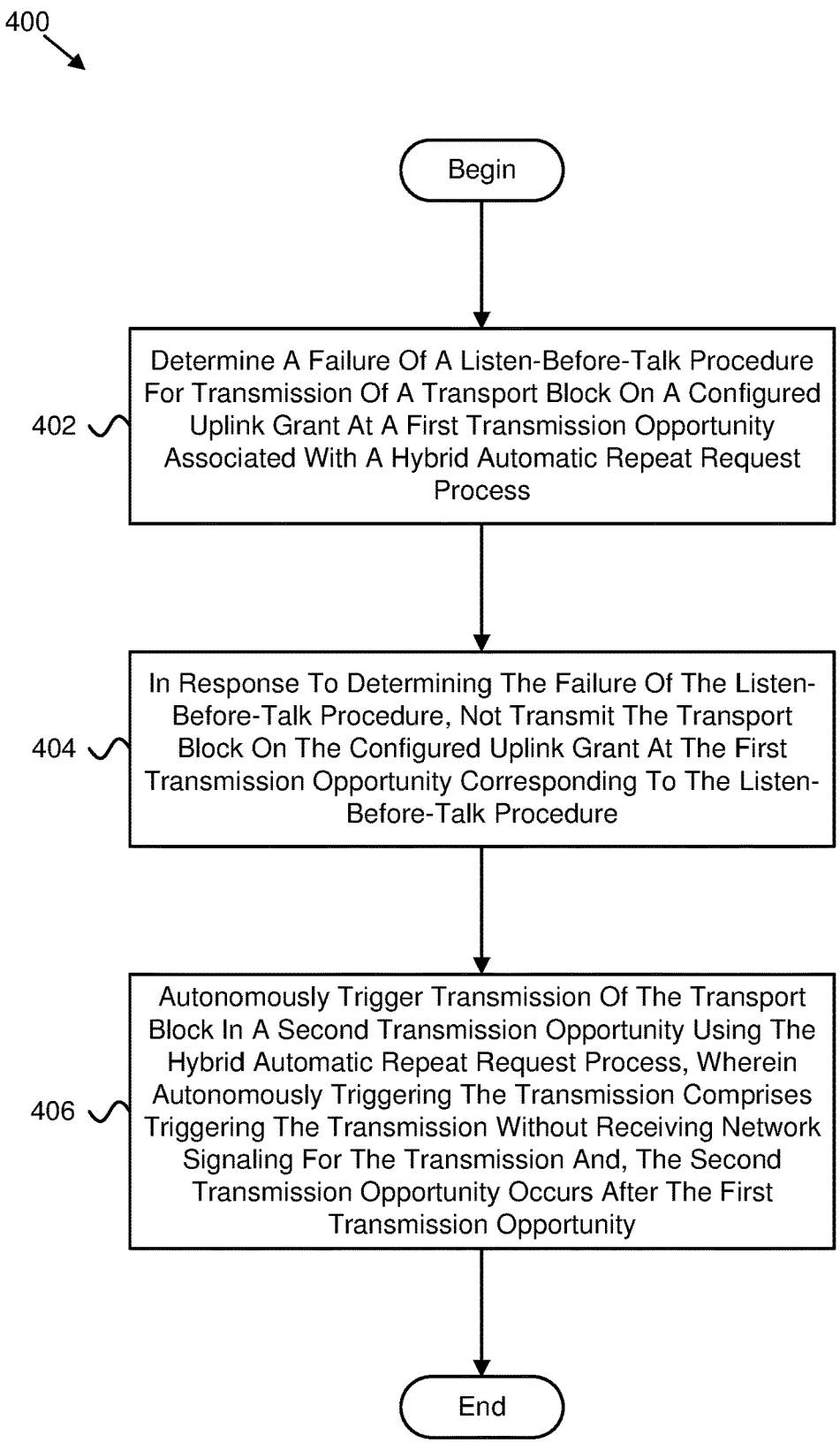
FIG. 4 is a flow chart diagram illustrating one embodiment of a method for transport block transmission.

FIG. 4 is a flow chart diagram illustrating one embodiment of a method 400 for transport block transmission. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes determining 402 a failure of a listen-before-talk procedure for transmission of a transport block on a configured uplink grant at a first transmission opportunity associated with a hybrid automatic repeat request process. In some embodiments, the method 400 includes, in response to determining the failure of the listen-before-talk procedure, not transmitting 404 the transport block on the configured uplink grant at the first transmission opportunity corresponding to the listen-before-talk procedure. In various embodiments, the method 400 includes autonomously triggering 406 transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

In certain embodiments, the second transmission opportunity is a next available transmission opportunity after the first transmission opportunity. In some embodiments, the second transmission opportunity is a configured grant resource. In various embodiments, the second transmission opportunity is a scheduled grant resource.

In one embodiment, a configured grant timer is not started in response to determining the failure of the listen-before-talk procedure. In certain embodiments, the hybrid automatic repeat request process is pending in response to determining the failure of the listen-before-talk procedure and not transmitting the transport block. In some embodiments, autonomously triggering the transmission of the transport block in the second transmission opportunity occurs in response to determining that the hybrid automatic repeat request process is pending and determining that the first transmission opportunity for the hybrid automatic repeat request process is the configured uplink grant.

In various embodiments, a new data indicator bit for the hybrid automatic repeat request process is not toggled at the second transmission opportunity. In one embodiment, the transport block is transmitted at the second transmission opportunity as a retransmission.

In one embodiment, a method comprises: determining a failure of a listen-before-talk procedure for transmission of a transport block on a configured uplink grant at a first transmission opportunity associated with a hybrid automatic repeat request process; in response to determining the failure of the listen-before-talk procedure, not transmitting the transport block on the configured uplink grant at the first transmission opportunity corresponding to the listen-beforetalk procedure; and autonomously triggering transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

In certain embodiments, the second transmission opportunity is a next available transmission opportunity after the first transmission opportunity.

In some embodiments, the second transmission opportunity is a configured grant resource.

In various embodiments, the second transmission opportunity is a scheduled grant resource.

In one embodiment, a configured grant timer is not started in response to determining the failure of the listen-before-talk procedure.

In certain embodiments, the hybrid automatic repeat request process is pending in response to determining the failure of the listen-before-talk procedure and not transmitting the transport block.

In some embodiments, autonomously triggering the transmission of the transport block in the second transmission opportunity occurs in response to determining that the hybrid automatic repeat request process is pending and determining that the first transmission opportunity for the hybrid automatic repeat request process is the configured uplink grant.

In various embodiments, a new data indicator bit for the hybrid automatic repeat request process is not toggled at the second transmission opportunity.

In one embodiment, the transport block is transmitted at the second transmission opportunity as a retransmission.

In one embodiment, an apparatus comprises: a processor that: determines a failure of a listen-before-talk procedure for transmission of a transport block on a configured uplink grant at a first transmission opportunity associated with a hybrid automatic repeat request process; in response to determining the failure of the listen-before-talk procedure, does not initiate transmission of the transport block on the configured uplink grant at the first transmission opportunity corresponding to the listen-before-talk procedure; and autonomously triggers transmission of the transport block in a second transmission opportunity using the hybrid automatic repeat request process, wherein autonomously triggering the transmission comprises triggering the transmission without receiving network signaling for the transmission and, the second transmission opportunity occurs after the first transmission opportunity.

In certain embodiments, the second transmission opportunity is a next available transmission opportunity after the first transmission opportunity.

In some embodiments, the second transmission opportunity is a configured grant resource.

In various embodiments, the second transmission opportunity is a scheduled grant resource.

In one embodiment, a configured grant timer is not started in response to determining the failure of the listen-before-talk procedure.

In certain embodiments, the hybrid automatic repeat request process is pending in response to determining the failure of the listen-before-talk procedure and not transmitting the transport block.

In some embodiments, autonomously triggering the transmission of the transport block in the second transmission opportunity occurs in response to determining that the hybrid automatic repeat request process is pending and determining that the first transmission opportunity for the hybrid automatic repeat request process is the configured uplink grant.

In various embodiments, a new data indicator bit for the hybrid automatic repeat request process is not toggled at the second transmission opportunity.

In one embodiment, the transport block is transmitted at the second transmission opportunity as a retransmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a first configured grant for an uplink transmission during a first transmission opportunity associated with a hybrid automatic repeat request (HARQ) process, the uplink transmission comprising a transport block (TB) and first related uplink control information (UCI);
refrain from transmitting the uplink transmission during the first transmission opportunity based in part on a result of a listen-before-talk (LBT);
in response to the result of the LBT being unsuccessful, not start a configured grant timer; and
transmit the uplink transmission comprising the TB associated with the refrained uplink transmission and second related UCI during a second transmission opportunity associated with the HARQ process without the configured grant timer starting and based in part on a status of the HARQ process, the first transmission opportunity corresponding to the first configured grant, the second transmission opportunity corresponding to a second configured grant, or a combination thereof.

2. The UE of claim 1, wherein the second transmission opportunity is a next available transmission opportunity after the first transmission opportunity.

3. The UE of claim 2, wherein the first configured grant is a previous grant associated with the HARQ process of the second configured grant.

4. The UE of claim 1, wherein the second configured grant indicates a same TB size as the first configured grant.

5. The UE of claim 1, wherein the at least one processor is configured to cause the UE to, in response to the result of the LBT indicating a failed LBT, refrain from starting a configured grant timer.

6. The UE of claim 1, wherein, in response to the result of the LBT indicating a failed LBT and in response to refraining from transmitting an uplink transmission comprising the TB and the first related UCI, the HARQ process is in a pending state.

7. The UE of claim 1, wherein the at least one processor is configured to cause the UE to refrain from toggling a new data indicator (NDI) bit for the HARQ process during the second transmission opportunity.

8. The UE of claim 1, wherein the at least one processor is configured to cause the UE to autonomously transmit the uplink transmission during the second transmission opportunity.

9. A method performed by a user equipment (UE), the method comprising:
  receiving a first configured grant for an uplink transmission during a first transmission opportunity associated with a hybrid automatic repeat request (HARQ) process, the uplink transmission comprising a transport block (TB) and first related uplink control information (UCI);
  refraining from transmitting the uplink transmission during the first transmission opportunity based in part on a result of a listen-before-talk (LBT);
  in response to the result of the LBT being unsuccessful, not starting a configured grant timer; and
  transmitting the uplink transmission comprising the TB associated with the refrained uplink transmission and second related UCI during a second transmission opportunity associated with the HARQ process without the configured grant timer starting and based in part on a status of the HARQ process, the first transmission opportunity corresponding to the first configured grant, the second transmission opportunity corresponding to a second configured grant, or a combination thereof.

10. The method of claim 9, wherein the second transmission opportunity is a next available transmission opportunity after the first transmission opportunity.

11. The method of claim 9, wherein the first configured grant is a previous grant associated with the HARQ process of the second configured grant.

12. The method of claim 9, wherein the second configured grant indicates a same TB size as the first configured grant.

13. The method of claim 9, further comprising, in response to the result of the LBT indicating a failed LBT, refraining from starting a configured grant timer.

14. The method of claim 9, wherein, in response to the result of the LBT indicating a failed LBT and in response to refraining from transmitting an uplink transmission comprising the TB and the first related UCI, the HARQ process is in a pending state.

15. The method of claim 9, further comprising refraining from toggling a new data indicator (NDI) bit for the HARQ process during the second transmission opportunity.

16. A base station, comprising:
  at least one memory; and
  at least one processor coupled with the at least one memory and configured to cause the base station to:
    transmit a first configured grant for an uplink transmission during a first transmission opportunity associated with a hybrid automatic repeat request (HARQ) process, the uplink transmission comprising a transport block (TB) and first related uplink control information (UCI); and
    receive the uplink transmission comprising the TB associated with a refrained uplink transmission based on a result of a listen-before-talk (LBT) and second related UCI during a second transmission opportunity associated with the HARQ process without a configured grant timer starting and based in part on a status of the HARQ process, the first transmission opportunity corresponding to the first configured grant, the second transmission opportunity corresponding to a second configured grant, or a combination thereof.

17. The base station of claim 16, wherein the second transmission opportunity is a next available transmission opportunity after the first transmission opportunity.

18. The base station of claim 16, wherein the second transmission opportunity comprises a configured grant resource.

19. The base station of claim 16, wherein the second transmission opportunity comprises a scheduled grant resource.

20. A processor for wireless communication, comprising:
  at least one controller coupled with at least one memory and configured to cause the processor to:
    receive a first configured grant for an uplink transmission during a first transmission opportunity associated with a hybrid automatic repeat request (HARQ) process, the uplink transmission comprising a transport block (TB) and first related uplink control information (UCI);
    refrain from transmitting the uplink transmission during the first transmission opportunity based in part on a result of a listen-before-talk (LBT);
    in response to the result of the LBT being unsuccessful, not start a configured grant timer; and
    transmit the uplink transmission comprising the TB associated with the refrained uplink transmission and second related UCI during a second transmission opportunity associated with the HARQ process without the configured grant timer starting and based in part on a status of the HARQ process, the first transmission opportunity corresponding to the first configured grant, the second transmission opportunity corresponding to a second configured grant, or a combination thereof.

* * * * *